United States Patent
Unger et al.

[11] Patent Number: 5,282,877
[45] Date of Patent: Feb. 1, 1994

[54] FILTRATION DEVICE

[75] Inventors: Phillip E. Unger; Petrus J. A. Tijm; Hendrik A. Dirkse, all of The Hague, Netherlands

[73] Assignee: Shell Oil Co., Houston, Tex.

[21] Appl. No.: 60,775

[22] Filed: May 11, 1993

[30] Foreign Application Priority Data

May 18, 1992 [EP] European Pat. Off. ........... 92201425

[51] Int. Cl.⁵ .............................................. B01D 46/24
[52] U.S. Cl. .......................................... 55/484; 55/523
[58] Field of Search ................. 55/345, 459.1, 482, 55/483, 484, 508, 523

[56] References Cited

U.S. PATENT DOCUMENTS 4,525,184 6/1985 Tassicker .
4,923,487 5/1990 Bogart et al. ................. 55/482
5,037,461 8/1991 Zievers et al. ................. 55/482

Primary Examiner—Charles Hart

[57] ABSTRACT

A filtration apparatus is described wherein entrained solids are removed from particulate-carrying fluid by filtration under vigorous conditions with filter tubes. The filter apparatus comprises a plurality of tiers of filters, each tier comprising filter tubes supported on a tube sheet. The apparatus also contains a tiered conical sluicing system to concentrate and centralize the particulates. The solids discharge from the filter tubes and pass through the sluicing system to exit the apparatus through particulate outlet means. The use of the apparatus is characterized by a reduced re-entrainment of particulates in the fluid leaving the apparatus.

5 Claims, 1 Drawing Sheet

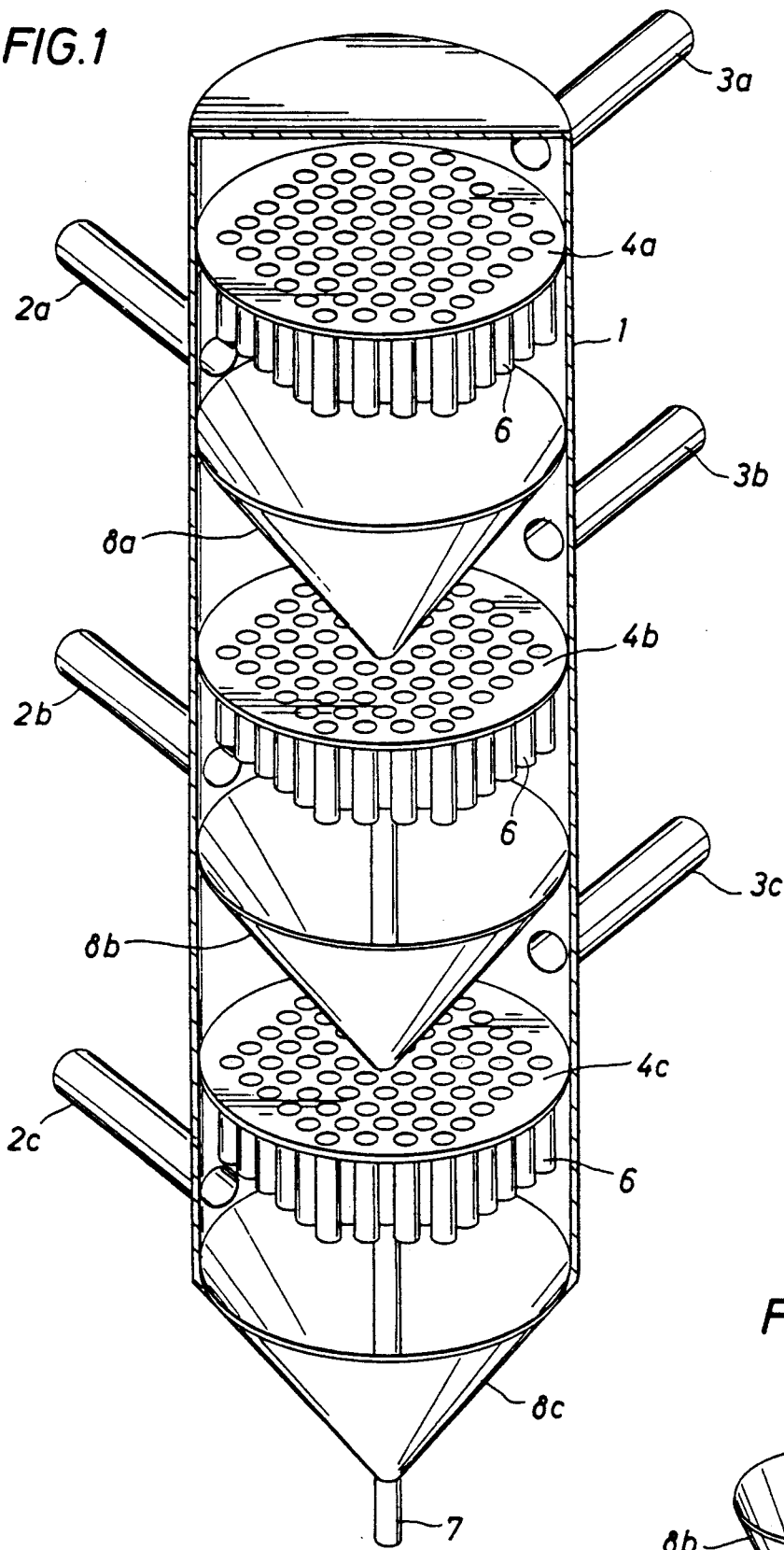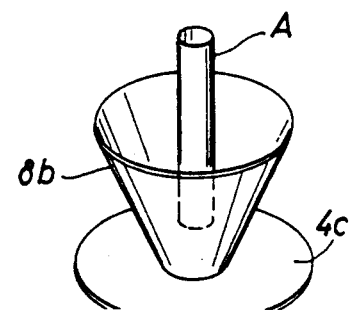

FILTRATION DEVICE

FIELD OF THE INVENTION

This invention relates to an improved filtration device for removing particulate solids from a carrier fluid.

BACKGROUND OF THE INVENTION

In the gasification of coal or oil, the process produces a desired synthesis gas but also produces considerable particulate solids such as ash. To efficiently utilize the synthesis gas so produced it is necessary to remove the entrained solids from the gas. This separation is often accomplished by a process of filtration conducted at elevated temperature and/or elevated pressure.

It is known to use, in such filtration processes, porous filter elements comprising a plurality of filter tubes, also referred to as candles because of the shape thereof, arranged in a parallel relationship and supported by a support tube or tube sheet.

The construction of the filter tubes will depend to a large extent upon the conditions under which the filtration is to be conducted. Under moderate filtering conditions including a filtration temperature of about 150° C. and a filtration pressure of about atmospheric, the filtration tubes are constructed from polyester, acrylic or glass. When streams of entrained solids in gases resulting from gasification of coal or oil are to be filtered, the filtration conditions are typically more vigorous, e.g., using temperatures as high as 900° C. and pressures from 5 to 30 times atmospheric. Under these conditions the filter tubes are constructed from porous ceramic or even porous, sintered steel.

The particles of solid to be removed by filtration are from about 0.2 micron to about 20 microns in size and are present in the gas in quantities of up to 10 parts per thousand parts by weight of gas, or even more. As filtration progresses, the deposit of particulates on the filter tubes increases as evidenced by an increased pressure drop. Eventually, the filter elements must be cleaned as by shaking the tubes, reversing the flow of gas or by other conventional means.

The construction of an industrial filter assembly containing a number of individual filtering elements, e.g., elements comprising a plurality of filter tubes, poses a number of mechanical problems. Some means of properly, conveniently and economically assembling the potentially hundreds of filter tubes must be devised. Some method of introducing the solids-containing fluid to be filtered must be employed and the fluid must be evenly distributed across the individual filter tubes. Moreover, there must be some method of cleaning the particulates from the filter tubes and subsequently collecting the particulates and removing them from the filter assembly.

Conventional filter assemblies for filtering solids from particulate-carrying fluids, particularly particulate-carrying gas, under vigorous filtration conditions typically comprise a main filtration vessel equipped with fluid inlets and fluid and particulate outlets and a single tube sheet attached to the interior wall of the vessel. This tube sheet has a plurality of filter tubes attached thereto. As the need for increased filtration capacity increases, the tube sheet is enlarged in diameter to support more filter tubes. At some diameter, the tube sheet will sag in the center unless the tube sheet is made sufficiently thick to retard such sagging. Eventually, this enlargement and thickening becomes economically unattractive. To prevent sagging by the provision of center supports is not generally satisfactory because of differential expansion and contraction of the supported tube sheet at the elevated temperatures of the filtration.

In Tassicker et al, U.S. Pat. No. 4,525,184, there is described a filter vessel wherein a plurality of filter assemblies are contained within the vessel and supported in a spaced apart relationship by a single support tube within the vessel. This tube, in addition to supporting these filter assemblies, cooperates with the assemblies and the vessel's outlet means to serve as a discharge tube for directing the filtered gas to the gas outlet. However, such devices having centrally-supported filter assemblies have operating problems when constructed on a large scale and there is risk of re-entraining the particulate solids in the filtered gas.

It would be of advantage to have a filter assembly for removing particulates entrained in a gas or other fluid under vigorous conditions of filtration which can be constructed for large scale operation and which reduces the re-entrainment of the filtered particulates in the filtered gas.

SUMMARY OF THE INVENTION

The present invention provides an improved filtration apparatus for removing particulate solids from fluid in which the solids are entrained under vigorous conditions of elevated temperature and pressure. The apparatus comprises (a) an elongated vessel provided with a plurality of fluid inlet means through which a particulate-containing carrier fluid enters the vessel and a plurality of fluid outlet means by which the filtered carrier fluid exits the vessel, (b) a particulate outlet means by which the particulates can leave the vessel, and (c) a plurality of vertically spaced filter elements carried by tube sheets mounted on the interior walls of the vessel in such a manner that compartments are formed in the vessel. The apparatus additionally contains a tiered conical particulate sluicing system to concentrate and centralize the particulates prior to the particulates leaving the vessel.

BRIEF DESCRIPTION OF THE DRAWINGS

FIG. 1 depicts an embodiment of the filtering apparatus of the invention.

FIG. 2 depicts a portion of the apparatus of FIG. 1 in greater detail.

DESCRIPTION OF THE INVENTION

In operation, particulate-carrying fluids, either gases or liquids but preferably gases, enter the filtration apparatus of the invention by fluid inlet means and encounter a plurality of filter tubes supported by tube sheets attached to the internal wall of the vessel. A plurality of tube sheets with filter tubes are employed to divide the apparatus into compartments. Under the vigorous conditions of filtration, e.g., temperatures from about 200° C. to about 900° C. and pressures from about 5 atm to about 30 atm, the filter tubes are preferably provided as porous ceramic candles although porous sintered metal candles are also satisfactory. The particulate-carrying fluid passes through the filter tubes to remove the entrained particulates and exits from the apparatus by one of a plurality of fluid outlet means.

The particulates which collect on the outside of the filter tubes, when removed from the filter tubes by influence of gravity, mechanical agitation, backflushing or other conventional methods, fall into one of a plurality of sluicing cones attached to the apparatus wall and, at the lower end, to the next lower tube sheet or a conduit leading to the particulate outlet means. The particulates fall from the sluicing cone through a sluicing duct and into the cone below, if any. Ultimately, the particulates leave the apparatus by a particulate outlet means.

DETAILED DESCRIPTION OF THE FIGURES

The invention is further illustrated by reference to the accompanying Figures. In FIG. 1, the filter apparatus comprises an elongated vessel 1 equipped with a plurality of particulate-carrying fluid inlet means 2 (2a, 2b, 2c) through which particulate-carrying fluid enters the vessel 1 and a plurality of fluid outlet means 3 (3a, 3b, 3c) through which the filtered fluid leaves the vessel 1. Also shown are a plurality of tube sheets 4 (4a, 4b, 4c), each attached to the internal wall of the vessel 1 to form compartments within the vessel 1. Each tube sheet additionally supports a plurality of filter tubes 6.

The vessel also contains a plurality of sluicing cones 8 (8a, 8b, 8c) attached to the internal wall of the vessel 1 and also, with the exception of the lowest cone, to the tube sheet immediately below (8b, 8c). The lowest cone is attached directly to the particulate outlet means 7.

In FIG. 1, there are shown only three tube sheets, three sluicing cones, three fluid inlets and three fluid outlets. It should be appreciated, however, that any number of tube sheets, sluicing cones, fluid inlets and fluid outlets can be employed, as determined by the nature of the particular filtration.

In FIG. 2, there is shown in more detail the relationship among tube sheet 4c, connecting duct A from the next higher tier and sluicing cone 8b.

As illustrative design for a filter apparatus of the invention is the following:

Filter Media: Porous ceramic candles
Filter Dimensions: 6 cm o.d. ×1.5 m length
Maximum Filter Density: 1 candle per 0.125 m² tube sheet area
Sluicing Cone Angle: 15° half angle; 30° full angle.

| Tiers: | Double | Triple |
|---|---|---|
| Number Elements | 912 | 912 |
| Tube Sheet o.d. | 2.9 m | 2.4 m |
| Total Vessel Height | 16.9 m | 22.3 m |
| Vessel Wall Thickness | 100 mm | 83 mm |
| Vessel Weight | 131 tons | 116 tons |

Such a vessel would operate at 250° C. and a pressure of 26 atm. A suitable material of construction would be carbon steel.

Various modifications of the present invention will become apparent to those skilled in the art from the foregoing description. Such modifications are intended to fall within the scope of the appended claims.

What is claimed is:

1. A filter apparatus for removing particulate solids from particulate-carrying fluid comprising:
   (a) an elongated vessel having a plurality of particulate-carrying fluid inlet means and a plurality of separate fluid outlet means, through which particulate-carrying fluid enters the vessel and filtered fluid leaves the vessel;
   (b) particulate outlet means through which particulate solids leave the vessel;
   (c) a plurality of vertically spaced filter assemblies comprising tube sheets supporting a plurality of filter elements, the tube sheets being attached to the inner wall thereby forming compartments; and
   (d) the vessel additionally containing a tiered conical particulate sluicing system to centralize and concentrate the particulates leaving the vessel.

2. The apparatus of claim 1 wherein the tiered conical particulate sluicing system comprises a plurality of sluicing cones, and a plurality of sluicing ducts, each duct being connected to the next higher cone and each duct except the lowest discharging into the cone below, each sluicing cone being connected to the internal wall of the vessel and each sluicing cone except the lowest being connected to the tube sheet below.

3. The apparatus of claim 2 wherein the filter elements are filter candles.

4. The apparatus of claim 3 wherein the filter candles are ceramic candles.

5. The apparatus of claim 3 wherein the filter candles are sintered metal candles.

* * * * *